(12) United States Patent
Yang et al.

(10) Patent No.: US 10,553,837 B2
(45) Date of Patent: Feb. 4, 2020

(54) SECONDARY BATTERY

(71) Applicant: CONTEMPORARY AMPEREX TECHNOLOGY CO., LIMITED, Ningde (CN)

(72) Inventors: Wei Yang, Ningde (CN); Rulai Cai, Ningde (CN); Xiang Li, Ningde (CN); Xianfeng Yu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 282 days.

(21) Appl. No.: 15/599,038

(22) Filed: May 18, 2017

(65) Prior Publication Data

US 2018/0138465 A1    May 17, 2018

(30) Foreign Application Priority Data

Nov. 15, 2016   (CN) .......................... 2016 1 1028083

(51) Int. Cl.
    *H01M 2/06*    (2006.01)
(52) U.S. Cl.
    CPC .................................... *H01M 2/06* (2013.01)
(58) Field of Classification Search
    None
    See application file for complete search history.

(56) References Cited

U.S. PATENT DOCUMENTS

| 10,199,615 B2 | 2/2019 | Li et al. |
| 2011/0135976 A1 | 6/2011 | Byun |

| 2012/0251851 A1 | 10/2012 | Kim et al. |
| 2012/0251852 A1 | 10/2012 | Kim |
| 2012/0315516 A1 | 12/2012 | Kim |

(Continued)

FOREIGN PATENT DOCUMENTS

| CN | 102088103 A | 6/2011 |
| CN | 102136552 A | 7/2011 |

(Continued)

OTHER PUBLICATIONS

First Office Action from CN App. No. 201611028083.0, dated Jul. 26, 2018, with machine English translation from Global Dossier.

(Continued)

*Primary Examiner* — Carmen V Lyles-Irving
(74) *Attorney, Agent, or Firm* — Ladas & Parry, LLP

(57) ABSTRACT

This application provides a secondary battery including an electrode assembly, a first terminal, a second terminal, a top cover plate and a contacting plate attached to the first terminal, the electrode assembly includes a first electrode, a second electrode and a separator between the first electrode and the second electrode, the first terminal is electrically connected with the first electrode, the second terminal is electrically connected with the second electrode, the top cover plate is insulated from the first terminal and is electrically connected with the second terminal, when internal pressure of the secondary battery exceeds reference pressure, the contacting plate deforms under the internal pressure and contacts the top cover plate, so as to form an electrical connecting path through the first electrode, the first terminal, the contacting plate, the top cover plate, the second terminal and the second electrode.

12 Claims, 6 Drawing Sheets

(56) References Cited

U.S. PATENT DOCUMENTS

| | | |
|---|---|---|
| 2013/0115511 A1 | 5/2013 | Han et al. |
| 2014/0045002 A1 | 2/2014 | Yokoyama et al. |
| 2014/0234673 A1* | 8/2014 | Byun .................... H01M 2/348 |
| | | 429/61 |
| 2015/0207118 A1* | 7/2015 | Guen .................... H01M 2/345 |
| | | 429/54 |
| 2015/0249241 A1 | 9/2015 | Han et al. |
| 2015/0263329 A1 | 9/2015 | Guen et al. |

FOREIGN PATENT DOCUMENTS

| | | |
|---|---|---|
| CN | 102136562 A | 7/2011 |
| CN | 102738522 A | 10/2012 |
| CN | 204668368 U | 5/2013 |
| EP | 2816637 A1 | 12/2014 |
| EP | 3062368 A1 | 8/2016 |
| JP | 2012011930 A | 1/2012 |
| JP | 2012212645 A | 11/2012 |
| JP | 2012221944 A | 11/2012 |
| JP | 2014035897 A | 2/2014 |
| JP | 2015176865 A | 10/2015 |

OTHER PUBLICATIONS

Extended European Search Report, from EP App. No. 17000793.4, dated Nov. 30, 2017.
Office action from EP App. No. 17000793.4, dated Oct. 29, 2018.
Notice of Reasons for Refusal, from JP App. No. 2017-218975, dated Nov. 14, 2018, with machine English translation from JPO.

* cited by examiner

SECONDARY BATTERY

CROSS-REFERENCE TO RELATED APPLICATIONS

The present application claims priority to Chinese Patent Application No. 201611028083.0, filed on Nov. 15, 2016, the content of which is incorporated herein by reference in its entirety.

TECHNICAL FIELD

The present application relates to the technical field of energy storage devices and, particularly, relates to a secondary battery.

BACKGROUND

Secondary battery which can be charged or discharged repeatedly, is wildly applied in compact and portable electronic equipment such as cellphones, laptops, etc. and in vehicles such as hybrid electric vehicles, pure electric vehicles, etc. Excessive heat will be generated in the interior of the second battery during the fast charging or high power discharging, and the electrolyte may discompose, which increases the internal pressure of the secondary battery, resulting in burning or explosion of the secondary battery, and therefore reduces the safety of the secondary battery.

In the relevant art, a contacting plate is generally provided in the secondary battery, and the contacting plate is attached onto the top cover plate, when the internal pressure of the secondary battery exceeds the reference pressure, the contacting plate deforms under the air pressure and electrically contacts with the conductive plate, which therefore results in an external short circuit between the positive electrode and the negative electrode of the cell.

However, in the above technical solution, the contacting plate is directly arranged on the top cover plate, since the top cover plate is readily influenced by external environment, for example, the cell may unavoidably expand during use, moreover, the top cover plate covers on the housing by welding and the housing will generate tensile stress on the top cover plate when expanding outward, or, welding tensile stress will be generated on the top cover plate during welding the top cover plate with the housing, etc., since the contacting plate is directly arranged on the top cover plate, thus, the contacting plate will also generate tensile stress. When being in a tensile stress state for a long time, stress fatigue will occur to the contacting plate, which may reduce the service life of the contacting plate; moreover, the tensile stress will reduce the sensitivity of the contacting plate, which causes that the contacting plate cannot act under a rated pressure, thereby reducing the safety of the secondary battery.

SUMMARY

Embodiments of the present application provide a secondary battery, which can solve the above deficiencies.

The present application provides a secondary battery, including: an electrode assembly, a first terminal, a second terminal and a top cover plate, wherein, the electrode assembly includes a first electrode plate, a second electrode plate and a separator between the first electrode plate and the second electrode plate, the first terminal is electrically connected with the first electrode plate, the second terminal is electrically connected with the second electrode plate, the secondary battery further includes: a contacting plate attached to the first terminal, the top cover plate is insulated from the first terminal and is electrically connected with the second terminal, when an internal pressure of the secondary battery exceeds a reference pressure, the contacting plate deforms by the internal pressure and contacts with the top cover plate, so as to form an electrical connecting path passing through the first electrode plate, the first terminal, the contacting plate, the top cover plate, the second terminal and the second electrode plate.

Preferably, a housing is provided, and the housing is covered by the top cover plate, so as to form a first chamber configured to package the electrode assembly and a second chamber configured to provide space where the contacting plate deforms, the first chamber and the second chamber are separated by the contacting plate.

Preferably, the top cover plate includes a body portion and a bulge portion, the bulge portion protrudes from a side of the body portion far away from the housing, the second chamber is defined by the contacting plate and the bulge portion.

Preferably, a through hole is arranged on the top cover plate, the second chamber is connected with external environment via the through hole.

Preferably, the secondary battery further includes a protection member, the protection member is arranged on the top cover plate and is directly opposite to the through hole, a channel connected with the through hole is arranged between the protection member and the top cover plate, the through hole is connected with the external environment via the channel, and an included angel between an extending direction of the channel and an extending direction of the through hole is nonzero.

Preferably, a groove is disposed on the top cover plate, the groove is connected with the through hole, the protection member covers the through hole and a part of the groove, the channel is formed in the groove.

Preferably, the top cover plate includes a ring-shaped boss, the ring-shaped boss protrudes along an axial direction of the through hole and surrounds the through hole, the protection member is connected onto a ring-shaped end surface of the ring-shaped boss, and a vent hole is arranged on a ring-shaped wall of the ring-shaped boss, the channel includes space defined by the top cover plate and the protection member and space in the vent hole.

Preferably, the first terminal includes a terminal body and an extending portion connected with the terminal body, an opening is arranged on the extending portion, the contacting plate seals the opening, so as to separate the first chamber and the second chamber.

Preferably, the terminal body and the extending portion are integrally formed or separately formed.

Preferably, the secondary battery further includes a sealing member arranged between the first chamber and the second chamber, the sealing member is connected between the extending portion and the top cover plate and has a first sealing surface which sealedly contacts with the top cover plate and a second sealing surface which sealedly contacts with the extending portion.

Preferably, the secondary battery further includes a sealing member arranged between the first chamber and the second chamber, the sealing member is sealed between the contacting plate and the top cover plate and has a first sealing surface which sealedly contacts with the top cover plate and a second sealing surface which sealedly contacts with the contacting plate.

Preferably, the first sealing surface and the second sealing surface are arranged opposite to each other along a height direction of the secondary battery.

Preferably, a first sealing slot is arranged on the top cover plate, a second sealing slot is arranged on the extending portion or the contacting plate, the opening is surrounded by the second sealing slot, and the first sealing slot and the second slot are arranged opposite to each other, the sealing member is embedded into the first sealing slot and the second sealing slot, the first sealing surface contacts with a bottom surface of the first sealing slot, and the second sealing surface contacts with a bottom surface of the second sealing slot.

Preferably, a cross section of the sealing member is shaped in a circle or a crisscross.

Preferably, the secondary battery further includes an insulating member and a fixing piece which are connected with each other, the fixing piece is fixedly connected with the top cover plate, the extending portion is fixedly connected with the insulating member.

Preferably, the fixing piece includes an exposed portion outside the insulating member and a packaged portion inside the insulating member, and the exposed portion is fixedly connected with the top cover plate.

Preferably, the contacting plate includes a deformable portion and a convex head, the deformable portion is formed in a sheet with a circular surface, the convex head is connected with the deformable portion and protrudes toward the top cover plate, an outer edge of the deformable portion is connected with the extending portion, and the convex head is configured to contact with the top cover plate when the contacting plate deforms.

Preferably, the secondary battery further includes a resistance member, the resistance member is connected in series into an electrical connecting path passing through the first electrode, the first terminal, the contacting plate, the top cover plate, the second terminal and the second electrode.

Preferably, the secondary battery further includes a second terminal board, the second terminal board is electrically connected with the second terminal, and the resistance member is connected in series between the second terminal board and the top cover plate.

Preferably, a range of a resistance value of the resistance member is between 0.1 mΩ and 10 mΩ.

Preferably, the secondary battery further includes a fusing member, the fusing member is connected in series into an electrical connecting path of short circuit between the first electrode and the second electrode, a flow area on the fusing member is less than a flow area on other positions in the electrical connecting path, and the fusing member is connected in series between the first electrode and the first terminal, and/or the fusing member is connected in series between the second electrode and the second terminal.

Preferably, the secondary battery further includes a first connecting piece and a second connecting piece, the first electrode is electrically connected with the first terminal via the first connecting piece, the second electrode is electrically connected with the second terminal via the second connecting piece, the fusing member is formed on the first connecting piece and/or the second connecting piece.

Preferably, the fusing member is formed by a gap and/or a hole set on the first connecting piece and/or the second connecting piece.

The technical solutions provided by the present application can achieve the following beneficial effects:

The secondary battery provided by the present application includes a first terminal, a second terminal, a top cover plate and a contacting plate, the contacting plate is attached onto the first terminal, the top cover plate is insulated from the first terminal and is electrically connected with the second terminal. When the internal air pressure of the secondary battery increases and exceeds the reference pressure, the contacting plate will act under the internal pressure and contact the top cover plate, so as to form an electrical connecting path through the first electrode, the first terminal, the contacting plate, the top cover plate, the second terminal and the second electrode, thereby reducing the risk of fire or explosion of the secondary battery and improving the safety of the secondary battery.

As one aspect of the present application, when the secondary battery expands or is compressed and the top cover plate is welded with the housing, the acting force generated therefrom will be applied on the top cover plate, if the contacting plate is arranged on the top cover plate, the top cover plate would deform and thus the contacting plate would deform correspondingly, which creates stress inside the contacting plate, and the stress will reduce the sensitivity of the contacting plate, in the present application, the contacting plate is attached onto the first terminal, which reduces the influence of the deformation of the top cover plate on the contacting plate, such that the reduction of the deformation sensitivity of the contacting plate will not readily occur, thereby improving the safety of the secondary battery.

As another aspect of the present application, the present application further avoids the need for an opening arranged on the top cover plate for mounting the contacting plate, which improves the strength of the top cover plate of a thin-wall structure.

It should be understood that the above general description and the following detailed description are merely exemplary, which are not used to limit the present application.

REFERENCE SIGNS

Figure 1:
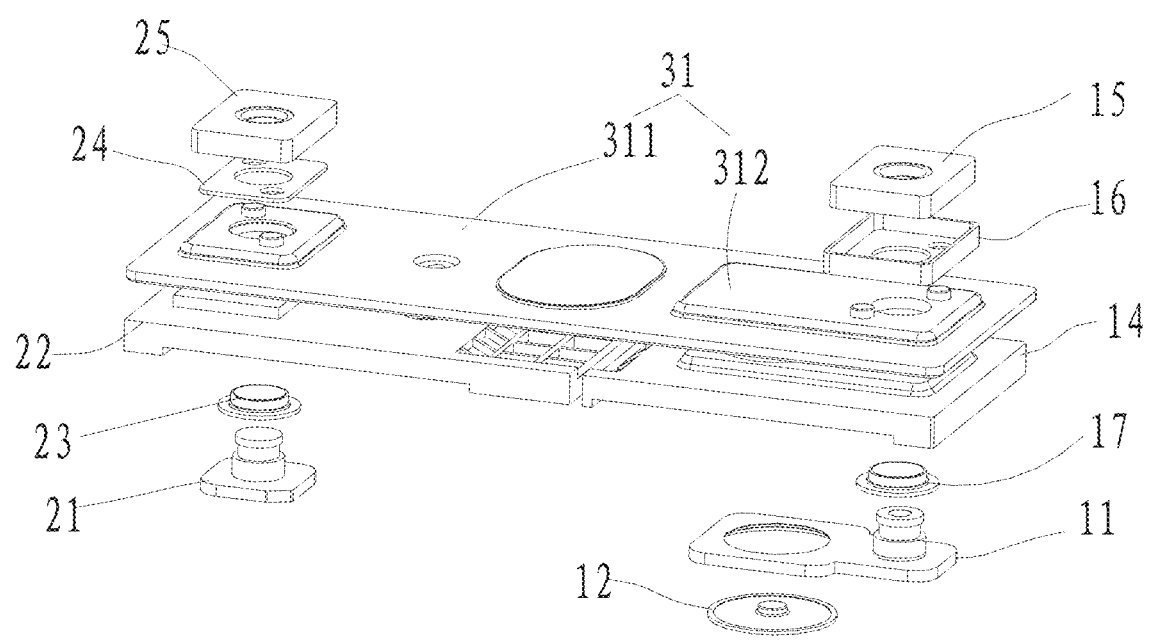
FIG. 1 is an exploded perspective view of a partial structure of a secondary battery according to an embodiment of the present application.

11—first terminal;
   111—terminal body;
   112—extending portion;
      112*a*—opening;
      112*b*—positioning table;
      112*c*—second sealing slot;
12—contacting plate;
   121—convex head;
      121*a*—second contacting surface;
   122—deformable portion;
      122*a*—positioning surface;
13—sealing member;
   131—first sealing surface;
   132—second sealing surface;
14—first insulating piece;
15—first terminal board;
16—insulating member;
17—first insulating liner;
18—insulating member;
19—fixing piece;
   191—exposed portion;
   192—packaged portion;
21—second terminal;
22—second insulating piece;
23—second insulating liner;
24—resistance member;
25—second terminal board;
31—top cover plate;
   31*a*—first contacting flat surface;
   311—body portion;
   312—bulge portion;
   313—through hole;
   314—groove;
   315—ring-shaped boss;
   316—vent hole;
   317—first sealing slot;
41—protection member.

The accompanying drawings herein are incorporated into the description and constitute a part of the description, which show the embodiments in accordance with the present application, and are used to explain the principles of the present application together with the description.

DESCRIPTION OF EMBODIMENTS

The present application will be described in further detail through embodiments with reference to the drawings. The expressions "front", "back", "left", "right", "top" and "bottom" mentioned in the disclosure are all referring to the placement state of the secondary battery in the figures.

As shown in FIGS. 1-9, embodiments of the present application provides a secondary battery, which includes a first terminal 11 and a second terminal 21, the first terminal 11 and the second terminal 21 can be connected with an external circuit so as to form a current loop, and the secondary battery serves as a power supply of the external circuit and outputs electric power for the external circuit.

The first terminal 11 can be used as a positive electrode terminal, correspondingly, the second terminal 21 is used as a negative electrode terminal, and vice versa. Hereinafter, the secondary battery provided by the present application is described in detail through embodiments in which the first terminal 11 is used as the positive electrode terminal (the first electrode is the positive electrode), the second terminal 21 is the negative electrode terminal (the second electrode is the negative electrode).

A secondary battery generally includes an electrode assembly, a housing (not shown in the figures) and a top cover plate 31, the top cover plate can cover on the housing by manners such as welding, so as to form an accommodating cavity, and the electrode assembly is accommodated in the accommodating cavity.

The electrode assembly generally includes a first electrode and a second electrode, the first electrode has a first electrode tab, the second electrode has a second electrode tab, the first electrode is electrically connected with the first terminal 11 via the first electrode tab, the second electrode is electrically connected with the second terminal 21 via the second electrode tab, so that the electrode assembly can output electric power to the external circuit.

Figure 2:
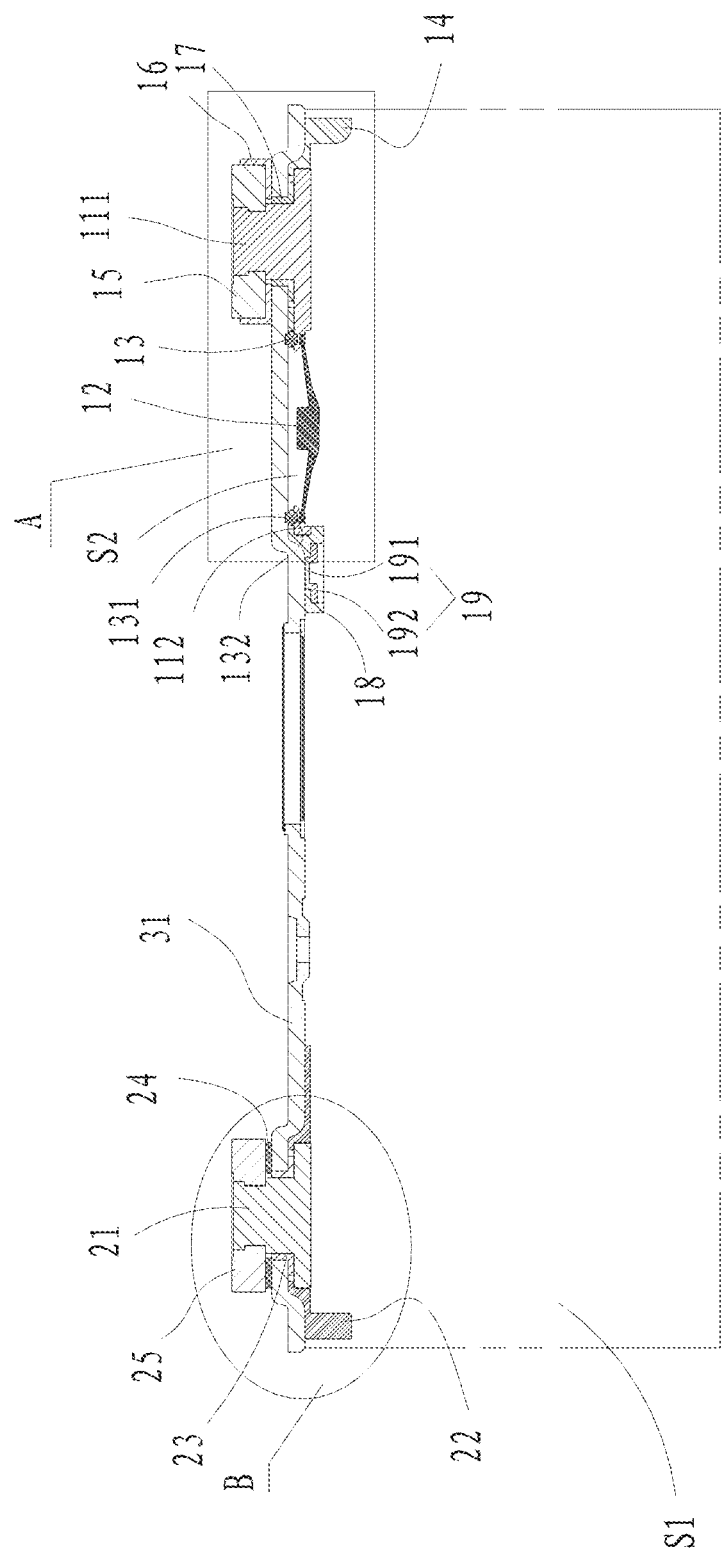
FIG. 2 is a sectional view of a partial structure of a secondary battery according to an embodiment of the present application.

The secondary battery provided by the present application further includes a contacting plate 12, in the embodiments as shown in FIGS. 1-2, the contacting plate 12 is attached to the first terminal 11, the top cover plate 31 is insulated from the first terminal 11 and is electrically connected with the second terminal 21. The contacting plate and the first terminal 11 can be integrally formed or separately formed.

When the internal pressure exceeds the reference pressure, the contacting plate 12 deforms and contacts with the top cover plate 31, so as to form an electrical connecting path passing through the first electrode, the first terminal 11, the contacting plate 12, the top cover plate 31, the second terminal 21 and the second electrode, such that the secondary battery will be in an external short circuit state, which therefore reduces the risk of explosion and burning of the secondary battery and improves the safety of the secondary battery.

When the contacting plate 12 deforms and contacts with the top cover plate 31, they may directly contact with each other, or a conductor is provided between the contacting plate 12 and the top cover plate 31, and the contacting plate 12 indirectly contacts with the top cover plate 31 via the conductor.

As an aspect of the present application, if the contacting plate 12 is arranged on the top cover plate 31, when the secondary battery expands or is compressed, the acting force resulted therefrom will be applied onto the top cover plate 31, then the top cover plate 31 will deform and make the contacting plate 12 deform, which generates stress in the interior of the contacting plate 12, and thus the pressure value of the contacting plate 12 during deformation will deviate from the preset reference pressure value, so that the sensitivity of the contacting plate 12 will deteriorate. By adopting the solution of the present application, since the contacting plate 12 is arranged on the first terminal 11, which reduces the influence of the deformation of the top cover plate 31 on the contacting plate 12, such that the phenomenon that the sensitivity of the contacting plate 12 deteriorates due to the above reason will not readily appear, so as to improve the safety of the secondary battery.

As another aspect of the present application, the contacting plate 12 is arranged on the first terminal 11, which avoids the need for an opening on the top cover plate 31 for mounting the contacting plate 12, so as to improve the strength of the top cover plate 31 of a thin wall structure.

The insulating manner between the top cover plate 31 and the terminal can be implemented, for example, by providing an insulating piece between the terminal and the top cover plate 31. As shown in FIGS. 1-2, a first insulating liner 17 is provided between the first terminal 11 and the top cover plate 31, the first insulating liner 17 is clamped between the first terminal 11 and the top cover plate 31, so as to achieve insulation therebetween. The material of the first insulating liner 17 can be rubber, asbestos, etc.

Additionally, in the embodiment in which the first terminal 11 is used as the negative electrode terminal, the top cover plate 31 is electrically connected with the second terminal 21 which is used as the positive electrode terminal, thus, the housing and the top cover plate 31 are both positively charged, so as to reduce the corrosion of the housing and the top cover plate 31 by the electrolyte and extend the service life.

Generally, part of the first terminal 11 and part of the second terminal 21 both extend beyond the top cover plate 31, and the extending portions are connected with the external circuit. In some embodiments, there is no need for the terminal which is electrically connected with the top cover plate 31 to extend beyond the top cover plate 31, in this occasion, the terminal can achieve electrical connection with the external circuit via the top cover plate 31.

As shown in FIG. 2, more exactly, the accommodating cavity formed after the top cover plate 31 covers on the housing includes a first chamber S1 and a second chamber S2. Specifically, the first chamber S1 is configured to package the electrode assembly, the second chamber S2 is configured to provide space where the contacting plate 12 deforms, and the first chamber S1 and the second chamber S2 are separated by the contacting plate 12. When the internal pressure of the first chamber S1 exceeds the reference pressure, the internal air pressure will be applied to the contacting plate 12 and push the contacting plate 12 to deform.

Since the space of the second chamber S2 formed after the housing is closely covered by the top cover plate 31 is limited, the space where the contacting plate 12 deforms is restricted, in order to increase the space, the top cover plate 31 preferably includes a body portion 311 and a bulge portion 312, the bulge portion 312 protrudes toward a side of the top cover plate 31 far away from the housing, so that the second chamber S2 is defined by the contacting plate 12 and the bulge portion 312. Thus, the space of the second chamber S2 is expanded, therefore, when the contacting plate 12 deforms, the air compression rate in the space decreases, and the resistance force against the deformation of the contacting plate 12 decreases, so as to improve the deformation sensitivity of the contacting plate 12.

Figure 3:
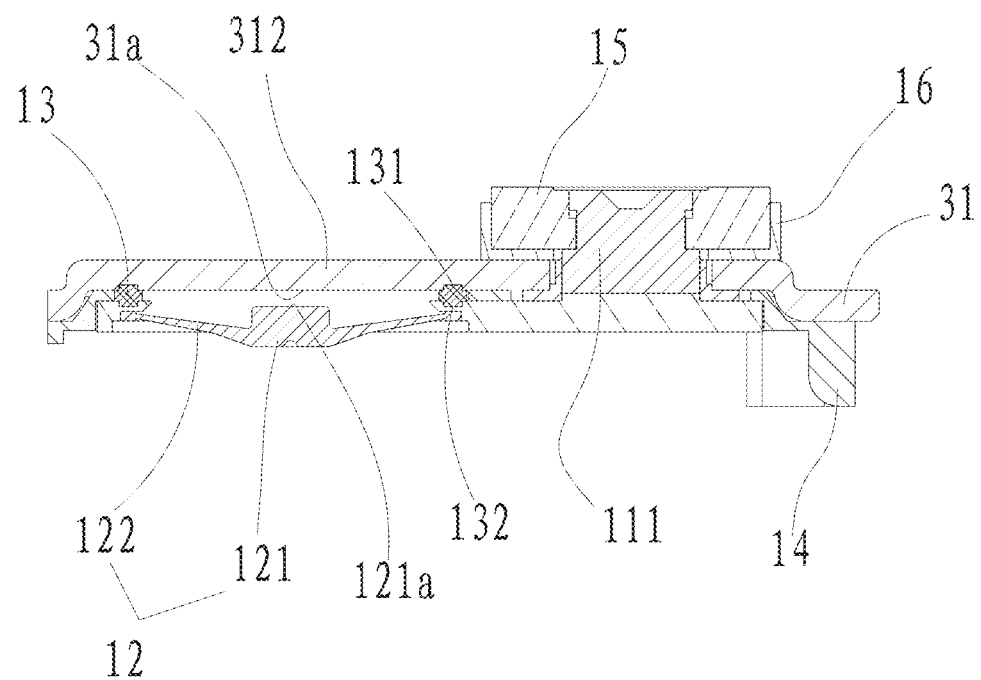
FIG. 3 is an enlarged view of section A in FIG. 2.

As shown in FIG. 3, the top cover plate 31 has a first contacting flat surface 31a, correspondingly, the contacting plate 12 has a second contacting flat surface 121a, and the first contacting flat surface 31a and the second contacting flat surface 121a are fitted with each other when the contacting plate 12 contacts with the top cover plate 31. This solution can provide a larger contacting area when the contacting plate 12 contacts with the top cover plate 31, so as to guarantee reliable electrical contact therebetween.

Figure 4:
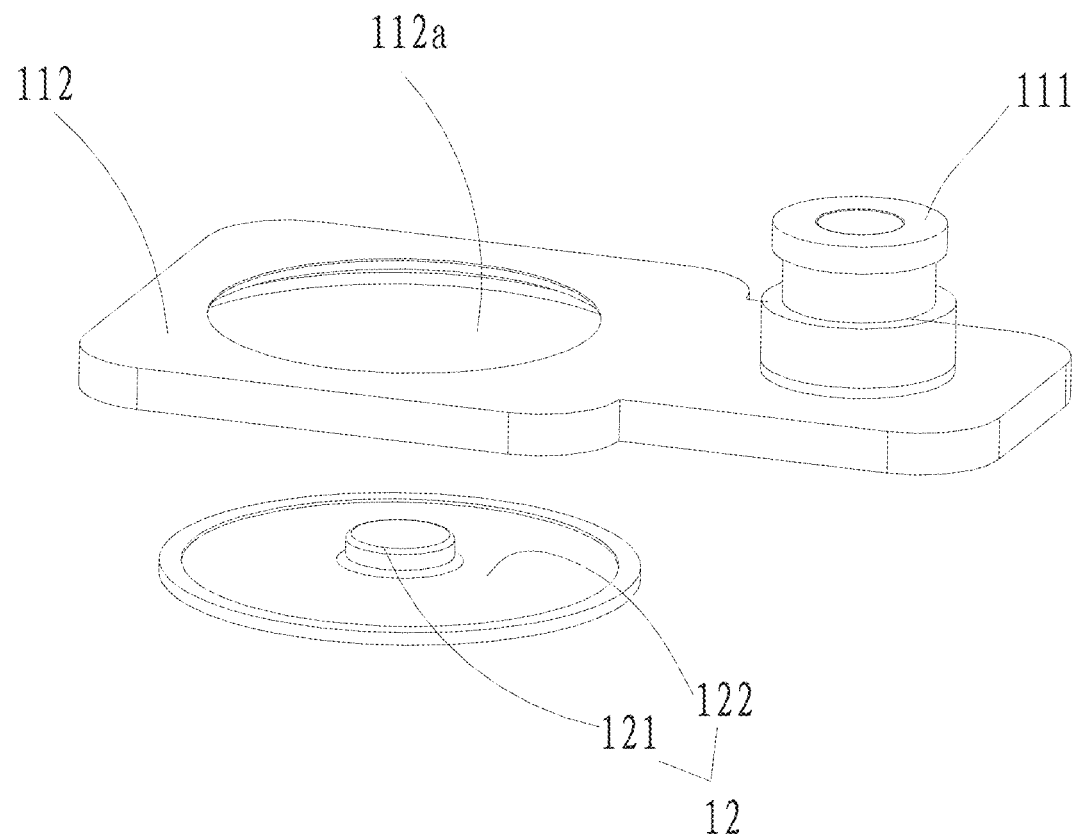
FIG. 4 is an exploded perspective view of a first terminal and a contacting plate according to an embodiment of the present application.
Figure 5:
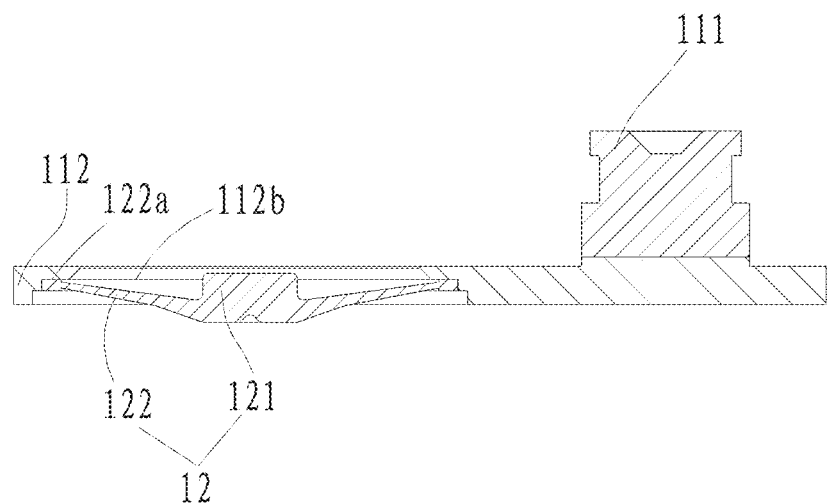
FIG. 5 is a sectional view of a first terminal being connected with a contacting plate according to an embodiment of the present application.

As shown in FIGS. 4-5, according to an embodiment of the present application, the contacting plate 12 includes a convex head 121 and a deformable portion 122; the deformable portion 122 is formed in a sheet with a circular surface, thus, the contacting plate 12 can deform and reliably act under the air pressure, the convex head 121 is connected with the deformable portion 122 and protrudes toward the top cover plate 31, so that the contacting plate 12 can contact the top cover plate 31 via the convex head 121 when the contacting plate 12 deforms. In this solution, due to the arrangement of the convex head 121, a suitable gap can be provided between the convex head 121 and the top cover plate 31 and in the meantime the distance of deforming of the contacting plate 12 is reduced, so as to improve the safety of the secondary battery. Further, the convex head 121 and the deformable portion 122 are of an integrated structure.

As for the top cover plate 31, the surface at a side of the top cover plate 31 toward the contacting plate 12 is a flat surface, which can be regarded as the first contacting flat surface 31a, as for the contacting plate 12, the contacting plate 12 is deformable, since a convex head 121 is provided at the middle portion of the contacting plate 12, thus, even if the contacting plate 12 deforms, the deformation extent of the convex head 121 is relatively small, and the surface at a side of the convex head 121 toward the top cover plate 31 is substantially a flat surface, which therefore can be regarded as the second contacting flat surface 121a.

In the embodiment as shown in FIGS. 4-5, the first terminal 11 includes a terminal body 111 and an extending portion 112 which are connected with each other, the extending portion 112 extends toward the first terminal 11, the extending portion 112 has an opening 112a, part of the outer edge of the contacting plate 12 is sealedly connected with the extending portion 112, so that the contacting plate 12 seals the opening 112a, and separates the first chamber S1 and the second chamber S2. Thus, when the contacting plate 12 deforms, the contacting plate 12 or, more exactly, the convex head 121 can contact with the top cover plate 31 via the opening 112a. The terminal body 111 is configured to electrically connect with the external circuit, the extending portion 112 is configured to connect with the contacting plate 12, so as to facilitate the configuration of the contacting plate 12 on the first terminal 11.

In the embodiment as shown in FIGS. 4-5, the terminal body 111 and the extending portion 112 are of an integrated structure, however, it should be noted that, in some other embodiments, the terminal body 111 and the extending portion 112 can also adopt a separated structure, which is not limited by the present application.

Further, a positioning table 112b is provided in the opening 112a, the outer edge of the contacting plate 12 has a positioning surface 122a, the positioning surface 122a and the positioning table 112b are positioned and fitted with each other, so as to guarantee that an exact gap is provided between the contacting plate 12 and the top cover plate 31. The positioning surface 122a and the positioning table 112b can be fixed by butt seam welding or adhesive bonding after being positioned and fitted with each other, so as to achieve a sealing connection.

In addition, in order to guarantee that the contacting plate 12 can quickly respond to the internal pressure of the secondary battery, the secondary battery further includes a sealing member 13 which is sealed between the first chamber S1 and the second chamber S2. According to an embodiment, as shown in FIG. 2, the sealing member 13 is sealedly connected between the extending portion 112 and the top cover plate 31, and the sealing member 13 has a first sealing surface 131 which is sealedly connected with the top cover plate 31 and a second sealing surface 132 which is sealedly connected with the extending portion 112.

Figure 6:
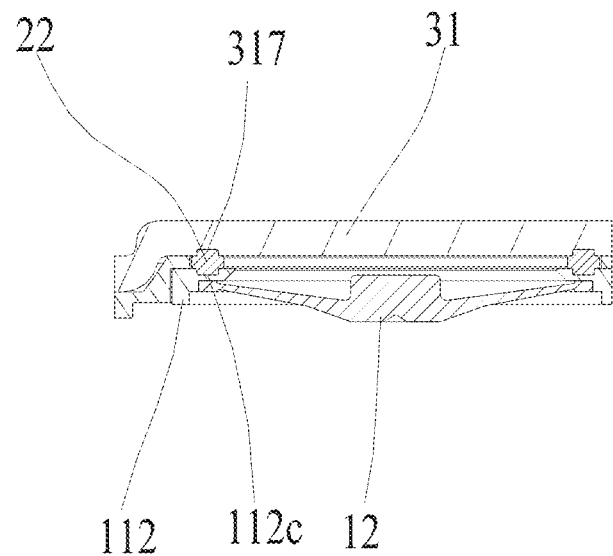
FIG. 6 is a schematic diagram of a sealing structure sealing between a first chamber and a second chamber according to an embodiment of the present application.

Specifically, as shown in FIG. 6, the sealing member 13 is of a ring-shaped structure, a first sealing slot 317 is provided on the top cover plate 31, a second sealing slot 112c is provided on the extending portion 112, more exactly, the second sealing slot 112c is provided on a flat surface which is on the extending portion 112 and perpendicular to the axis of the opening 112a, the second sealing slot 112c surrounds the opening 112a, and the first sealing slot 317 and the second sealing slot 112c are arranged opposite to each other, the sealing member 13 is embedded into the first sealing slot 317 and the second sealing slot 112c, which therefore forms the first sealing surface 131 and the second sealing surface 132 which are arranged opposite to each other along the height direction of the secondary battery, and the first sealing surface 131 sealedly contacts with the bottom surface of the first sealing slot 317, the second sealing surface 132 sealedly contacts with the bottom surface of the second sealing slot 112c.

Similarly, in some other embodiments, the sealing member 13 can be sealedly connected between the contacting plate 12 and the top cover plate 31, and the sealing member 13 has a sealing surface 131 which sealedly contacts with the top cover plate 31 and a second sealing surface 131 which sealedly contacts with the contacting plate 12. The sealing structure between the top cover plate 31 and the contacting plate 12 can adopt substantially the same sealing structure as described above, and the second sealing slot is arranged on the contacting plate 12 as long as it will not influence the deformation of the contacting plate 12.

In an embodiment as shown in FIG. 2 and FIG. 6, the cross section of the sealing member 13 is shaped in a crisscross, in some other embodiments, the cross section of the sealing member 13 could also be shaped in a circle. The sealing member 13 with a circular cross section or a cross-shaped cross section is convenient for processing and manufacturing, of course, the shape of the cross section the sealing member 13 could also be other irregular shape.

Besides, a plastic piece can be provided between the first terminal 11 and the top cover plate 31, the plastic piece can serve as an insulating piece on one hand, and serve as the sealing member 13 on the other hand, so as to reduce the number of the components needed in the secondary battery and simplify the assembling process.

The extending portion 112 extends from the terminal body 111 toward the second terminal 21, which makes the extending portion be a cantilever structure, thus, the extending portion 112 will be displaced under the contacting force when the extending portion 112 or the contacting plate 12 sealedly contacts with the top cover plate 31, such that defects such as poor sealing effect will occur. In order to solve this problem, the secondary battery provided by the present application further includes an insulating member 18 and a fixing piece 19 which are connected with each other, as shown in FIG. 2, the fixing piece 19 is fixedly connected with the top cover plate 31, and the extending portion 112 is fixedly connected with the insulating member 18. In such an arrangement, the insulating member 18 and the fixing piece 19 provide reaction force for the extending portion 112, the direction of the reaction force is opposite to the direction of the contacting force when sealing, which alleviates the cantilever structure of the extending portion 112, so as to improve the reliability of the sealing.

There are a plurality of connecting manners for the insulating member 18 and the fixing piece 19, in the embodiment as shown in FIG. 2, the fixing piece 19 includes an exposed portion 191 which is exposed outside the insulating member 18 and a packaged portion 192 which is packaged inside the insulating member 18, the exposed portion 191 is fixedly connected with the top cover plate 31, the insulating member 18 packages the packaged portion 192, so that the fixing piece 19 is insulated from other components.

Preferably, the insulating member 18 and the fixing piece 19 are of an integrated structure, which is formed by integral injection molding.

In the above embodiments, the second chamber S2 which provides space where the contacting plate 12 deforms is an airtight chamber, the pressure of the second chamber S2 is theoretically one bar, however, when the secondary battery generates heat, the pressure in the second chamber S2 will increase, which influences the deformation sensitivity of the contacting plate 12. Accordingly, as shown in FIGS. 7-8, a through hole 313 is provided on the top cover plate 31, the second chamber S2 is communicated with the external environment via the through hole 313, thus, the second chamber S2 is not sealed off and is communicated with the external environment, therefore, the pressure of the air in the second chamber S2 will not increase with the heat generation of the secondary battery, which therefore improves the deformation sensitivity of the contacting plate 12.

Further, in order to prevent the electrolyte or other impurities from entering the through hole 313, the secondary battery further includes a protection member 41 which is provided on the top cover plate 31 and is exactly opposite to the through hole 313, a channel S3 which is communicated with the through hole 313 is provided between the protection member 41 and the top cover plate 31, the through hole 313 is communicated with the external environment via such channel S3, and the included angel between the extending direction of the channel S3 and the extending direction of the through hole 313 is nonzero. In this solution, the through hole 313 is not externally exposed, but communicated with the external environment via the channel S3, which reduces the risk that the electrolyte and the like entering the through hole 313.

Figure 7:
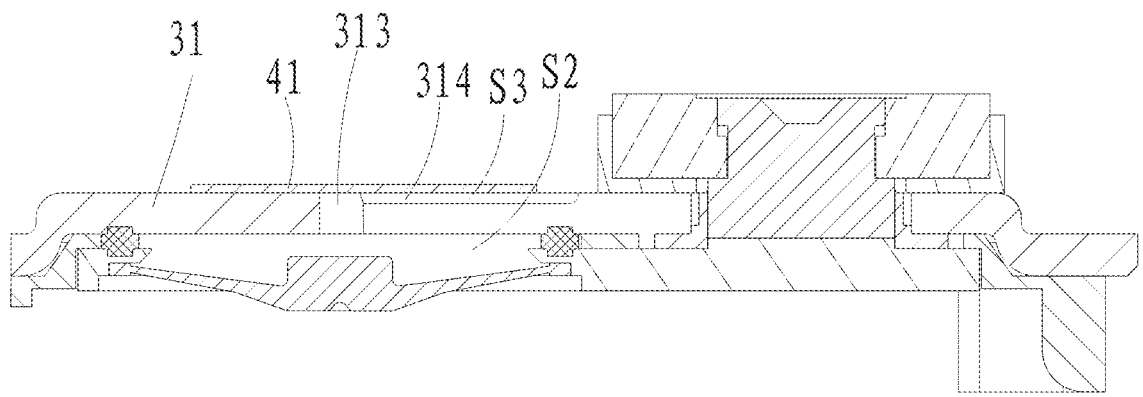
FIG. 7 is a schematic diagram of connection between a protection member and a top cover plate according to Embodiment 1 of the present application.

According to an embodiment, as shown in FIG. 7, a groove 314 is provided on the top cover plate 31, the groove 314 is communicated with the through hole 313, the protection member 41 covers the through hole 313 and part of the groove 314, the channel S3 is formed in the groove 314.

Figure 8:
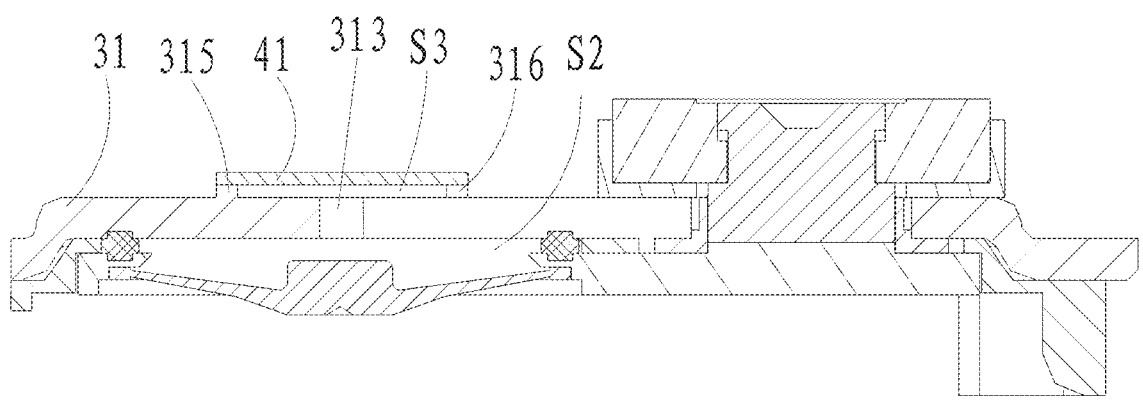
FIG. 8 is a schematic diagram of connection between a protection member and a top cover plate according to Embodiment 2 of the present application.

According to another embodiment, as shown in FIG. 8, the top cover plate 31 includes a ring-shaped boss 315, the ring-shaped boss 315 protrudes along the axial direction of the through hole 313 and surrounds the through hole 313, the protection member 41 is connected with the ring-shaped end surface of the ring-shaped boss 315, and an vent hole 316 is provided on the ring-shaped wall of the ring-shaped boss 315, the channel S3 includes a space enclosed by the top cover plate 31 and the protection member 41 and a space inside the vent hole 316.

In the present application, the secondary battery further includes a resistance member 24, the resistance member 24 is connected in series into an electrical connecting path through the first electrode, the first terminal 11, the contacting plate 12, the top cover plate 31, the second terminal 21 and the second electrode. In this solution, due to the resistance member 24, the peak value of the short circuit current of the electrical connecting path can be controlled at the instant of conduction.

In addition, the resistance member 24 plays a role of reducing the peak value of the short circuit current, however, in practical cases, there is also occasion that the contacting position of the contacting plate 12 with the top cover plate 31 fuses, such that the electrode assembly and the external circuit form an open circuit, which avoids dangerous accidents such as burning and explosion, etc. The resistance value of the resistance member 24 can be selected from the range of 0.1 mohm~10 mohm, for example, the resistance member 24 can be made of a material selected from a group consisting of steel, stainless steel and nickel-steel alloy, etc.

Figure 9:
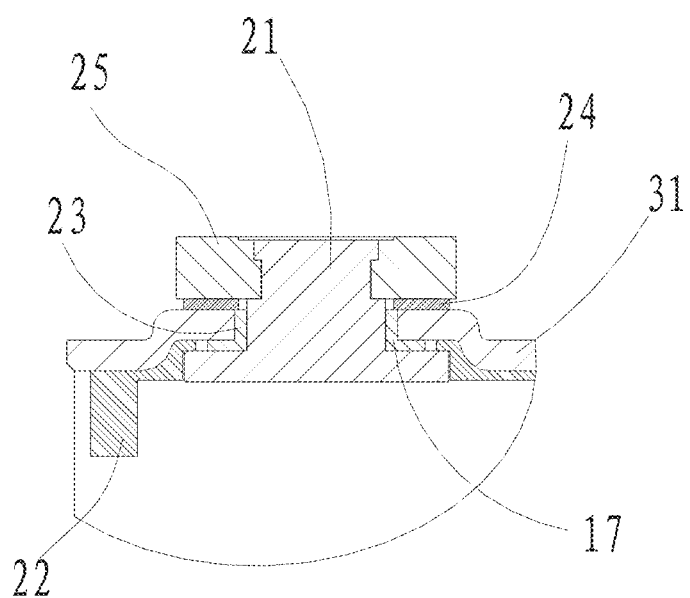
FIG. 9 is an enlarged view of section B in FIG. 2.

The position of the resistance member 24 can be selected according to actual application situation, as shown in FIG. 9, the resistance member 24 is provided at the second terminal 21, the top cover plate 31 is electrically connected with the second terminal 21 via the resistance member 24. In this solution, the resistance member 24 can be less influenced by the heat generated when the contacting plate 12 contacts with the top cover plate 31.

As shown in FIGS. 1-2, the secondary battery may further include a second terminal board 25, the second terminal board 25 is electrically connected with the second terminal 21, in such occasion, the resistance member 24 can be connected in series between the second terminal board 25 and the top cover plate 31, thus, the short circuit current flows through the top cover plate 31, the resistance member 24, the second terminal board 25 and the second terminal 21, which facilitates the arrangement of the resistance member 24. It should be noted that, a second insulating liner 23 is provided between the second terminal 21 and the top cover plate 31, one end of the second terminal 21 far away from the top cover plate 31 is electrically connected with the top cover plate 31 via the second terminal board 25 and the resistance member 24, the other end of the second terminal 21 adjacent to the top cover plate 31 is insulated from the top cover plate 31 via a second insulating liner 23.

Correspondingly, the secondary battery may further include a first terminal board 15, the first terminal board 15 is electrically connected with the first terminal 11, and the first terminal board 15 is insulated from the top cover plate 31 through an insulating member 16 which is provided between the first terminal board 15 and the top cover plate 31. It should be noted that, the first terminal board 15 and the second terminal board 25 can facilitate the connection between the first terminal 11 and the second terminal 21 with the external circuit, which is convenient for assembling, but is not necessarily required.

It should be understood by the person in the art that, when the secondary battery is in normal operation, the normal current sequentially flows through the second terminal board 25, the second terminal 21 and the second electrode, even if there exists the resistance member 24, the output of the secondary battery during normal operation will not be influenced.

The present application further includes a fusing member (not shown in the figures), the fusing member is connected in series into the electrical connecting path through the first electrode, the first terminal 11, the contacting plate 12, the top cover plate 31, the second terminal 21 and the second electrode, moreover, the flow area of the fusing member is less than the flow area at other positions in the electrical connecting path. The fusing member can be connected in series between the first electrode and the first terminal 11, or, the fusing member can also be connected in series between the second electrode and the second terminal 21, or, there are two fusing members, one is connected in series between the first electrode and the first terminal 11, the other is connected in series between the second electrode and the second terminal 21. Due to arrangement of the fusing member, the electrical connecting path can fuse at the fusing member when a large short circuit current flows through, so as to cut off the electrode assembly from the external circuit, thereby reducing the risk of burning and explosion of the secondary battery.

The fusing member can be independently arranged, or integrated with other components as a whole. According to an embodiment, the secondary battery can further includes a first connecting piece and a second connecting piece, the first connecting piece is connected between the first electrode and the first terminal, the second connecting piece is connected between the second electrode and the second terminal. The fusing member is formed on at least one of the first connecting piece and the second connecting piece.

During the normal operation of the secondary battery, the first connecting piece can serve as an electrical connecting piece which connects the first electrode with the first terminal 11, the second connecting piece can serve as an electrical connecting piece which connects the second electrode with the second terminal 21, which improves the assembling process of the secondary battery and avoids deformation of the first electrode tab and the second electrode tab during assembling. Moreover, when the first electrode and the second electrode form short circuit, the fusing member formed on the first connecting piece or the second connecting piece can fuse, which then cuts off the short circuit passing through the first electrode and the second electrode.

The fusing member can be implemented by providing a gap or a hole on the first connecting piece, such that the flow area formed on the first connecting piece is less than the flow area on the other positions, the position with smaller flow area is the location of the fusing member. Similarly, the forming manner of the fusing member on the second connecting piece can adopt the above structure, which will not be repeated herein.

It should be noted that, both the fusing member and the resistance member 24 can be connected in series into the electrical connecting path through the first electrode, the first terminal 11, the contacting plate 12, the top cover plate 31, the second terminal 21 and the second electrode, the resistance member 24 can reduce the short circuit current at the instant the contacting plate 12 contacts with the top cover plate 31, however, the reduced short circuit current is sufficient to fuse the fusing member, so as to cut off the electrical connecting path.

As shown in FIGS. 1-2, the secondary battery further includes a first insulating piece 14 and a second insulating piece 22, the first insulating piece 14 and the second insulating piece 22 are provided underneath the top cover plate 31 for increasing the electric clearance and the creepage distance between the electrode assembly and the top cover plate 31, so as to avoid the conduction between the electrode assembly and the top cover plate 31.

The above is merely illustration of the embodiments in which the first terminal 11 is the positive electrode terminal and the second terminal 21 is the negative electrode terminal, however, the present application is not limited to the above embodiments, for example, the first terminal 11 can also be used as a negative electrode terminal and the second terminal 21 can be used as a positive electrode terminal.

Moreover, the person skilled in the art should understand that, based on the position of the contacting plate 12, the structure and arranging method for each component of the secondary battery can be varied accordingly.

The above are merely preferred embodiments of the present application, which are not used to limit the present application, for the person skilled in the art, the present application can have various alternations and changes. Any modification, equivalent substitution and improvement etc. within the spirit and principles of the present application shall all fall into the protection scope of the present application.

What is claimed is:

1. A secondary battery, comprising: a housing, an insulating member and a fixing piece which are connected with each other, an electrode assembly, a first terminal, a second terminal and a top cover plate, wherein, the electrode assembly comprises a first electrode plate, a second electrode plate and a separator between the first electrode plate and the second electrode plate, the first terminal is electrically connected with the first electrode plate, the second terminal is electrically connected with the second electrode plate, the secondary battery further comprises: a contacting plate attached to the first terminal, the top cover plate is insulated from the first terminal and is electrically connected with the second terminal, when an internal pressure of the secondary battery exceeds a reference pressure, the contacting plate deforms by the internal pressure and contacts with the top cover plate, so as to form an electrical connecting path passing through the first electrode plate, the first terminal, the contacting plate, the top cover plate, the second terminal and the second electrode plate, the housing is covered by the top cover plate, so as to form a first chamber configured to package the electrode assembly and a second chamber configured to provide space where the contacting plate deforms, and the first chamber and the second chamber are separated by the contacting plate, wherein the first terminal comprises a terminal body and an extending portion connected with the terminal body, and an opening is arranged on the extending portion, the contacting plate seals the opening, so as to separate the first chamber and the second chamber, and the fixing piece is fixedly connected with the top cover plate, and the extending portion is fixedly connected with the insulating member, wherein a through hole is arranged on the top cover plate, the second chamber is connected with external environment via the through hole, wherein the secondary battery further comprising a protection member, the protection member is arranged on the top cover plate and is directly opposite to the through hole, a channel connected with the through hole is arranged between the protection member and the top cover plate, the through hole is connected with the external environment via the channel, and an included angle between an extending direction of the channel and an extending direction of the through hole is nonzero.

2. The secondary battery according to claim 1, wherein the top cover plate comprises a body portion and a bulge portion, the bulge portion protrudes from a side of the body portion far away from the housing, the second chamber is defined by the contacting plate and the bulge portion.

3. The secondary battery according to claim 1, wherein a groove is disposed on the top cover plate, the groove is connected with the through hole, the protection member covers the through hole and a part of the groove, the channel is formed in the groove.

4. The secondary battery according to claim 1, wherein the top cover plate comprises a ring-shaped boss, the ring-shaped boss protrudes along an axial direction of the through hole and surrounds the through hole, the protection member is connected onto a ring-shaped end surface of the ring-shaped boss, and a vent hole is arranged on a ring-shaped wall of the ring-shaped boss, the channel comprises space defined by the top cover plate and the protection member and space in the vent hole.

5. The secondary battery according to claim 1, further comprising a sealing member arranged between the first chamber and the second chamber, the sealing member is connected between the extending portion and the top cover plate and has a first sealing surface which sealedly contacts with the top cover plate and a second sealing surface which sealedly contacts with the extending portion.

6. The secondary battery according to claim 1, further comprising a sealing member arranged between the first chamber and the second chamber, the sealing member is sealed between the contacting plate and the top cover plate and has a first sealing surface which sealedly contacts with the top cover plate and a second sealing surface which sealedly contacts with the contacting plate.

7. The secondary battery according to claim 5, wherein the first sealing surface and the second sealing surface are arranged opposite to each other along a height direction of the secondary battery.

8. The secondary battery according to claim 7, wherein a first sealing slot is arranged on the top cover plate, a second sealing slot is arranged on the extending portion or the contacting plate, the opening is surrounded by the second sealing slot, and the first sealing slot and the second slot are arranged opposite to each other, the sealing member is embedded into the first sealing slot and the second sealing slot, the first sealing surface contacts with a bottom surface of the first sealing slot, and the second sealing surface contacts with a bottom surface of the second sealing slot.

9. The secondary battery according to claim 1, wherein the fixing piece comprises an exposed portion outside the insulating member and a packaged portion inside the insulating member, and the exposed portion is fixedly connected with the top cover plate.

10. The secondary battery according to claim 1, wherein the contacting plate comprises a deformable portion and a convex head, the deformable portion is formed in a sheet with a circular surface, the convex head is connected with the deformable portion and protrudes toward the top cover plate, an outer edge of the deformable portion is connected with the extending portion, and the convex head is configured to contact with the top cover plate when the contacting plate deforms.

11. The secondary battery according to claim 1, further comprising a resistance member, the resistance member is connected in series into an electrical connecting path passing through the first electrode, the first terminal, the contacting plate, the top cover plate, the second terminal and the second electrode.

12. The secondary battery according to claim 11, further comprising a second terminal board, the second terminal board is electrically connected with the second terminal, and the resistance member is connected in series between the second terminal board and the top cover plate.

* * * * *